United States Patent
Makabe

(10) Patent No.: US 11,623,315 B2
(45) Date of Patent: Apr. 11, 2023

(54) MAIN SHAFT FOR ROTATING TOOL PROVIDED WITH TOOL SEATING CHECK FUNCTION

(71) Applicant: NISSEI HOMMA MACHINERY CO., LTD., Hyogo-ken (JP)

(72) Inventor: Toshio Makabe, Osaka (JP)

(73) Assignee: NISSEI HOMMA MACHINERY CO., LTD.

( * ) Notice: Subject to any disclaimer, the term of this patent is extended or adjusted under 35 U.S.C. 154(b) by 0 days.

(21) Appl. No.: 16/655,037

(22) Filed: Oct. 16, 2019

(65) Prior Publication Data

US 2020/0130067 A1 Apr. 30, 2020

(30) Foreign Application Priority Data

Oct. 31, 2018 (JP) .............................. JP2018-204598

(51) Int. Cl.
*B23Q 17/00* (2006.01)

(52) U.S. Cl.
CPC .................................. *B23Q 17/005* (2013.01)

(58) Field of Classification Search
CPC .... B23Q 17/00; B23Q 17/002; B23Q 17/005; B23Q 17/006; B23Q 17/2216; B23Q 17/2225; B23Q 11/005; B23Q 11/1015; B23B 9/005; Y10T 409/309464
See application file for complete search history.

(56) References Cited

U.S. PATENT DOCUMENTS

| | | | |
|---|---|---|---|
| 3,603,203 A * | 9/1971 | Rhodes | B23Q 17/006 409/232 |
| 4,480,366 A * | 11/1984 | Takahashi | B23B 29/04 29/26 A |
| 4,504,824 A * | 3/1985 | Mello | B23B 49/001 340/680 |
| 5,002,442 A * | 3/1991 | Rutschle | B23Q 17/003 409/134 |
| 7,331,742 B2 * | 2/2008 | Kikkawa | B23B 31/265 408/239 R |
| 10,130,997 B2 * | 11/2018 | Ishizu | B23B 31/265 |

(Continued)

FOREIGN PATENT DOCUMENTS

| | | | |
|---|---|---|---|
| DE | 102004015594 A1 * | 10/2004 | ............. B23B 31/02 |
| DE | 102005007354 A1 * | 9/2005 | ......... B23Q 11/1015 |

(Continued)

OTHER PUBLICATIONS

Description JP2012016786A (translation) obtained at https://worldwide.espacenet.com/ (last visited Jan. 29, 2021).*
Description DE102016102035A1 (translation) obtained at https://worldwide.espacenet.com/ (last visited Apr. 14, 2021).*
English-language machine translation of Notice of Reasons for Refusal dated Oct. 6, 2020 in Japanesse Patent Application No. 2018-204598.

(Continued)

*Primary Examiner* — Ryan Rufo
(74) *Attorney, Agent, or Firm* — Adams & Wilks

(57) ABSTRACT

A rotating tool is held in a tool holder. The tool holder includes a male tapered portion. The tool holder is rotated by a rotating-tool main shaft. The rotating-tool main shaft includes a hollow main shaft. The hollow main shaft includes a circular conical hole formed in a tip and corresponding to the male tapered portion. The hollow main shaft includes a fluid passage to detect that the male tapered portion is properly attached to the circular conical hole, and an opening to blow out a fluid. The opening is provided in a portion offset from the circular conical hole.

11 Claims, 6 Drawing Sheets

(56) References Cited

U.S. PATENT DOCUMENTS

| | | | | |
|---|---|---|---|---|
| 10,792,735 B2 * | 10/2020 | Yamamoto | ........... | B23Q 3/1574 |
| 2011/0121521 A1 * | 5/2011 | Fujimura | ............. | B23Q 17/003 |
| | | | | 279/4.02 |
| 2018/0036854 A1 * | 2/2018 | Takano | ................ | B23Q 11/005 |

FOREIGN PATENT DOCUMENTS

| | | | | | |
|---|---|---|---|---|---|
| DE | 102014112116 A1 * | 2/2016 | | .......... | B23Q 17/006 |
| DE | 102016102035 A1 * | 8/2017 | | .......... | B23B 31/265 |
| JP | 47046705 | | 11/1972 | | |
| JP | 2006110652 A | * | 4/2006 | | |
| JP | 2012016786 A | * | 1/2012 | | |
| JP | 2017159383 A | * | 9/2017 | | |
| SU | 1678577 A1 * | 9/1991 | | ........... | B23Q 11/005 |

OTHER PUBLICATIONS

English-language machine translation of Publication No. JP 2012-016786, publication date Jan. 26, 2012.

English-language machine translation of Japanese Publication No. JP 2006-334676, Publication Date Dec. 14, 2006.

English-language machine translation of Notice of Reasons for Refusal dated May 11, 2021 in Japanese Patent Application No. 2018-204598.

English-language machine translation of Publication No. JP 63-212438, publication date Sep. 5, 1968.

English-language machine translation of Publication No. JP 2008-135316, publication date Jul. 10, 2008.

* cited by examiner

MAIN SHAFT FOR ROTATING TOOL PROVIDED WITH TOOL SEATING CHECK FUNCTION

FIELD OF THE INVENTION

The present disclosure relates to a main shaft for a multi-tasking lathe rotating tool (also a "rotating-tool main shaft" below), and more particularly, to a rotating-tool main shaft provided with a tool seating check function.

BACKGROUND OF THE INVENTION

Multi-tasking lathes that cause a tool, such as a bite or a milling cutter, to rotate around a main shaft to execute cutting and machining on a workpiece have become popular.

A rotating tool is attached to such a rotating-tool main shaft using a tool holder. JP 2006-334676 A discloses such a known structure.

FIG. 5 is a diagram for describing a basic principle of conventional technologies.

A rotating tool 101 is attached to a tool holder 102. The tool holder 102 includes a male tapered portion 103.

A circular conical hole 105 that corresponds to the male tapered portion 103 is provided in a tool holding unit 104. A tank 106 is externally installed, and this tank 106 is filled with a liquid 107. This liquid 107 is pumped up by a pump 108. A fluid supplying passage 111 is extended from a discharge port of the pump 108, and a tip of the fluid supplying passage 111 is opened in the circular conical hole 105.

Such an opening 112 is blocked by the male tapered portion 103. When blocked, the pressure in the fluid supplying passage 111 becomes equal to the discharging pressure by the pump 108.

When a foreign material 113 is present, this does not allow the male tapered portion 103 to be intimately in contact with the circular conical hole 105, and thus the fluid 107 leaks to the exterior. In this case, the pressure in the fluid supplying passage 111 becomes lower than the discharging pressure of the pump 108.

By monitoring the pressure in the fluid supplying passage 111, it becomes apparent whether or not the tool holder 102 is properly attached to the tool holding unit 104.

Meanwhile, the inventors of the present disclosure tested the structure disclosed in JP 2006-334676 A, and found the following technical problems.

Tiny scratches were observed on the male tapered portion 103.

When the tool holder 102 is detached, and the circular conical hole 105 was observed from the tool-holder-102 side, as illustrated in FIG. 6A, the opening 112 was seen.

As illustrated in FIG. 6B that is a cross-sectional view taken along a line B-B in FIG. 6A, the opening 112 is formed in the circular conical hole 105.

FIG. 6C is an enlarged view of a part C in FIG. 6B, and formation of a tiny dent 114 was observed at the edge of the opening 112.

As illustrated in FIG. 6D, it is assumed that, when the male tapered portion 103 was repeatedly fitted in the circular conical hole 105, the rear-end edge of the male tapered portion 103 could collide the edge (rearward edge) of the opening 112. When such a collision occurred multiple times, this could form the dent 114.

In order to address this technical problem, chamfering was executed on the opening 112. Although there was an improvement, a long-term use of the disclosed structure still formed the dent 114. It becomes apparent that chamfering is insufficient as a solution.

When the dent 114 becomes large, the fluid leaks, and pressure information such that the tool holder 102 is not properly attached to the tool holding unit 103, it is necessary to eliminate the dent 114 periodically or as needed. Such an elimination work increases costs.

Because a reduction of various costs is being demanded, a structure that prevents a formation of a dent in the circular conical hole is desirable.

SUMMARY OF THE INVENTION

An objective of the present disclosure is to provide a main shaft for a rotating tool provided with a tool seating check function the prevents a formation of a dent in a circular conical hole.

According to a first embodiment of the present disclosure, a main shaft for a rotating tool is provided with a tool seating check function, and includes:

a rotating tool held in a tool holder, the tool holder comprising a male tapered portion, and the tool holder being rotated by the rotating-tool main shaft; and a hollow main shaft that has a circular conical hole which is formed in a tip and which corresponds to the male tapered portion, the hollow main shaft comprising a fluid passage to detect that the male tapered portion is properly attached to the circular conical hole, and an opening to blow out a fluid, wherein the opening is provided in a portion offset from the circular conical hole.

A possibility such that the rear-end edge of the male tapered portion collides the opening is reduced. Because there is no collision, a formation of a dent that has an adverse effect in the circular conical hole is prevented.

That is, according to the present disclosure, a rotating-tool main shaft provided with a rotating tool seating check function is provided.

It is preferable that the offset portion from the circular conical hole should be a cylindrical portion that extends from a small-diameter end of the circular conical hole.

Although the male tapered portion is inclined relative to the rotation axis, the cylindrical portion is in parallel with the rotation axis, thus not intimately in contact with the male tapered portion. By providing the opening in such a cylindrical portion, a formation of a dent is preventable.

Moreover, since the cylindrical portion is continuous from the circular conical hole, an increase in machining costs for the hollow main shaft does not occur.

It is preferable that the opening should be provided in a position where the blown-out fluid collides the male tapered portion.

That is, the center axis of the opening intersects the male tapered portion.

When the male tapered portion is about to be fitted in the circular conical hole and such a fitting is not finished yet, the blown-out fluid collides the male tapered portion, and flows along the male tapered portion. This flows cleans the circular conical hole and the male tapered portion.

BRIEF DESCRIPTION OF THE DRAWINGS

Several preferable embodiments of the present disclosure will be described in detail below with reference to the figures in which.

DETAILED DESCRIPTION OF THE PREFERRED EMBODIMENTS

Figure 1:
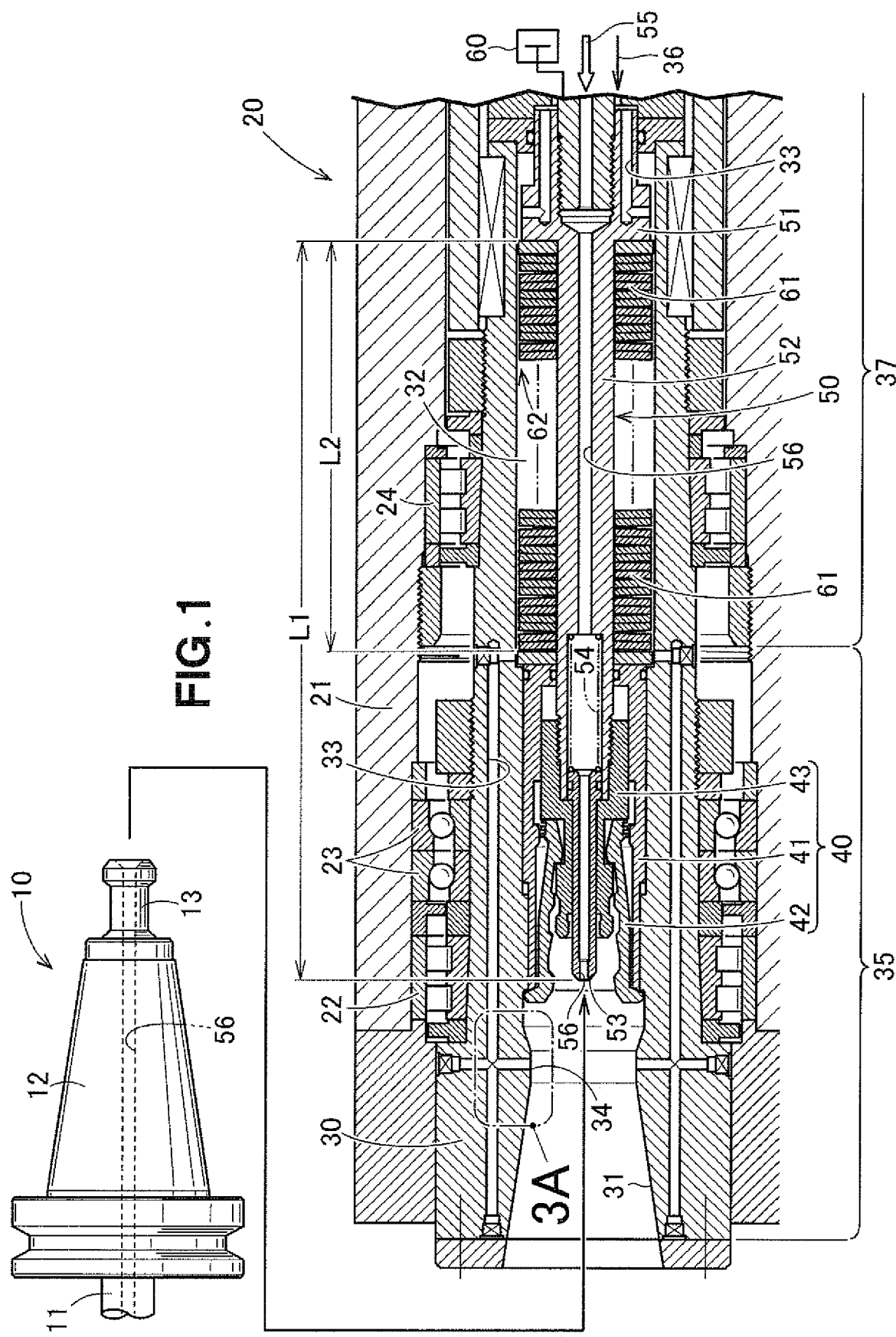
FIG. 1 is a cross-sectional view of a main shaft for a rotating tool according to the present disclosure.

As illustrated in FIG. 1, a tool holder 10 holds therein a rotating tool 11 that is also called a cutting tool, and includes a male tapered portion 12, and a pull stud 13 at a tail section.

The tool holder 10 is rotated by a rotating-tool main shaft 20.

The rotating-tool main shaft 20 includes a hollow ram 21, bearings 22, 23 and 24, a hollow main shaft 30, a collet chuck mechanism 40, a draw bar 50, a hydraulic cylinder 60, and disc springs 61.

The bearings 22, 23 and 24 are fitted in the hollow ram 21, and support the hollow main shaft 30. The hollow main shaft 30 is thus freely rotatable.

The collet chuck mechanism 40 is held in the hollow main shaft 30.

The draw bar 50 has a role of actuating the collet chuck mechanism 40.

The hydraulic cylinder 60 has a role of moving forward the draw bar 50.

The disc springs 61 have a role of moving backward the draw bar 50.

The hollow main shaft 30 has a circular conical hole 31 formed in a tip so as to correspond to the male tapered portion 12, and has a spring retaining space 32 formed in a rear-half portion 37.

The collet chuck mechanism 40 includes a collet retaining cylinder 41 retained in the hollow main shaft 30, a pinch-type collet 42 built in the collet retaining cylinder 41, and a collet driving member 43 which is fastened to the draw bar 50 and which opens and closes the collet 42.

The draw bar 50 includes a spring catch 51 which is retained in the hollow main shaft 30 and which catches the disc springs 61.

The disc springs 61 are placed between the draw bar 50 and the hollow main shaft 30 in the spring retaining space 32.

The disc springs 61 are placed at a front side. Consequently, the disc springs 61 are placed within a distance L2 that is at least a half of a distance L1 in the axial direction from the tip of the draw bar 50 to the spring catch 51. By increasing the number of disc springs 61, the stroke of the draw bar 50 can be increased.

The draw bar 50 includes a bar main body 52 that includes the spring catch 51, a nozzle 53 in a tubular shape attached to the tip of the bar main body 52 so as to be movable in the axial direction, and a spring 54 which is retained in the bar main body 52 and which pushes forwardly the nozzle 53. According to this example, the forward-movement limit (a forward movement maximum position) of the nozzle 53 is restricted by the collet driving member 43.

A coolant flow channel 56 through which a coolant 55 indicated by a white arrow is formed in the bar main body 52 and in the nozzle 53. The term coolant 55 means a cutting fluid that also serves as a cooling fluid.

The coolant 55 is supplied to the tool holder 10, and is also supplied to the rotating tool 11. The rotating tool 11 is efficiently cooled down, and a space relative to a workpiece subjected to cutting and machining is effectively lubricated, enabling a high-load cutting and machining.

Provided in a front-half portion 35 of the hollow main shaft 30 are a fluid passage 33 to detect that the male tapered portion 12 is properly attached to the circular conical hole 31, and an opening 34 to blow out the fluid. A fluid 36 indicated by an arrow is supplied to the fluid passage 33. It is preferable that the fluid 36 should be air, but may be an inactive gas like nitrogen or other kinds of fluids.

Figure 2:
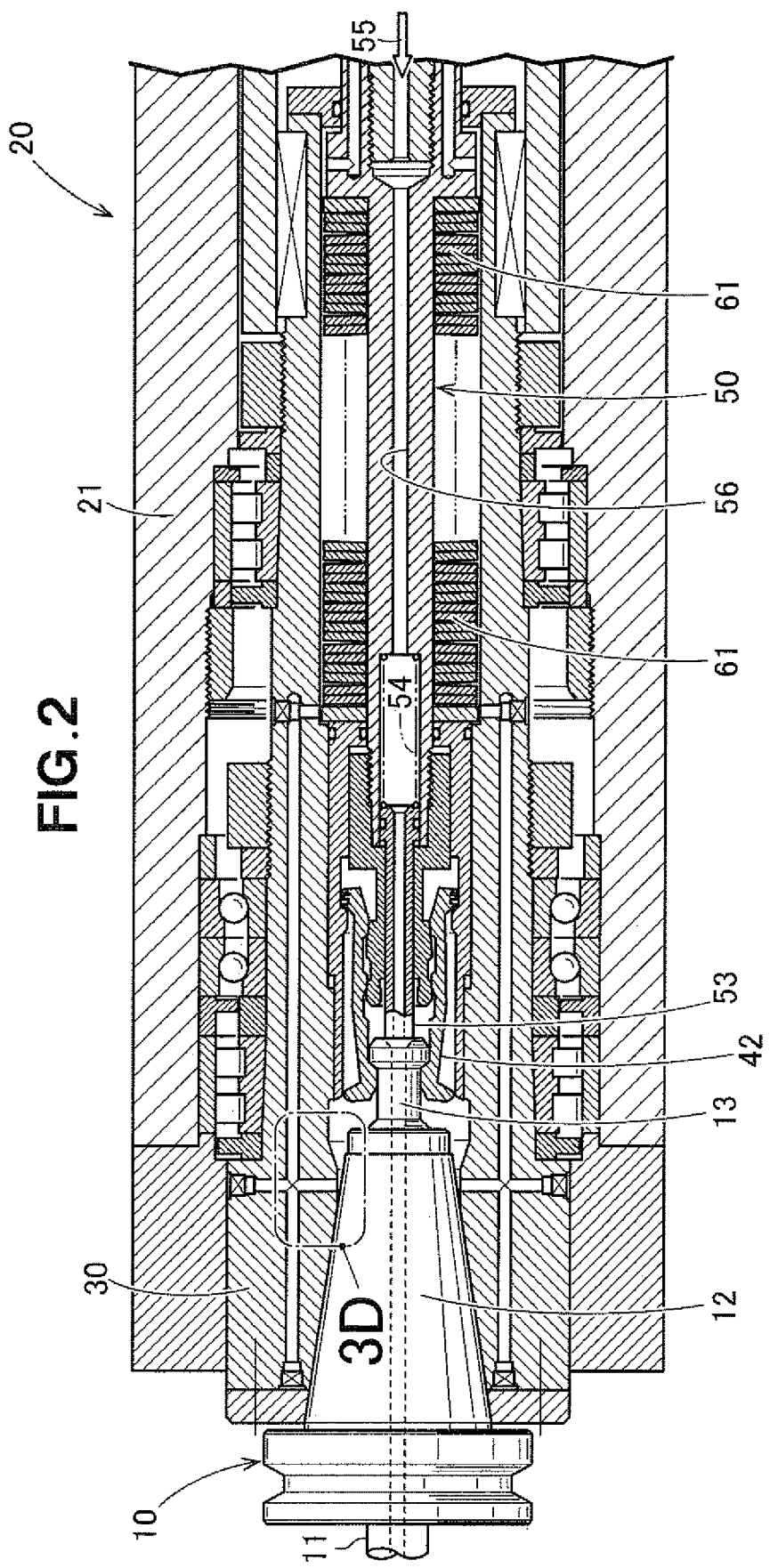
FIG. 2 is a diagram illustrating an action of the rotating-tool main shaft.

Meanwhile, the fluid passage 33 may be provided in the solid part of the rear-half portion 37 of the hollow main shaft 30. In this case, however, it is necessary to thicken the rear-half portion 37. According to this embodiment, a clearance 62 is provided between the respective outer circumferences of the disc springs 61 and the wall surface of the spring retaining space 32, and the fluid 36 is caused to flow through this clearance 62. As shown in FIGS. 1-2, the fluid passage 33 extends serially, without interruption, lengthwise through the clearance 62, then outwardly in a direction orthogonal to the rotary axis of the hollow main shaft 30 from an end of the clearance 62, then in the lengthwise direction parallel to the rotary axis to a location rearward of the tapered or conical hole 31, and then inwardly in a direction orthogonal to the rotary axis to the opening 34.

This enables the rear-half portion 37 of the hollow main shaft 30 to be thinned, and thus the outer diameter of the disc spring 61 can be increased by what corresponds to this thinning.

According to this embodiment, the outer diameter of the disc spring 61 is set to be larger than the outer diameter of the collet retaining cylinder 41.

The disc spring 61 that has a large outer diameter has a leeway in allowable distortion. When the allowable distortion is large, a large stroke can be achieved by the relatively small number of disc springs 61.

Alternatively, when the number of disc springs 61 is set, the distortion per a disc spring 61 is defined. When the distortion is constant, the disc spring 61 that has a large outer diameter has small stress. The smaller the stress is, the smaller the load to the disc spring 61 becomes.

From the different standpoint, according to this embodiment, the length (a length in the axial direction) of the spring retaining space 32 can be reduced.

If the disc spring that has a small outer diameter has a small allowable distortion per a spring, and spring force is small. In order to achieve the desired total distortion (stroke) and spring force, it is necessary to increase the number of disc springs that have a small outer diameter. When the number is increased, the spring retaining space 32 should be elongated.

In this point, when the disc spring 61 that has a large diameter is adopted like this embodiment, the disc spring 61 has a large allowable distortion per a spring, and has large spring force. In order to achieve the desired total distortion (stroke) and the desired spring force, it is sufficient if the number of disc springs 61 is small. When the number is small, the length of the spring retaining space 32 can be reduced.

Next, the tool holder 10 is attached to the hollow main shaft 30 in such a way that the male tapered portion 12 abuts the circular conical hole 31. The pull stud 13 is inserted in the collet 42. The pull stud 13 contacts the nozzle 53. When the pull stud 13 is further inserted, the spring 54 is compressed, and the nozzle 53 is retracted.

Next, when the hydraulic pressure to the hydraulic cylinder 60 is set to be zero, because of the spring force by the disc springs 61, the draw bar 50 is moved to the right side in the figure (a direction becoming apart from the circular conical hole 31). This movement decreases the diameter of the collet 42.

As illustrated in FIG. 2, the tool holder 10 is attached to the hollow main shaft 30. Because the nozzle 53 is depressed against the pull stud 13 by the spring 54, no coolant 55 leaks toward the collet 42.

When the hollow main shaft 30 is rotated, the tool holder 10 is rotated, and the rotating tool 11 is also rotated. At this time, the tool holder 10 rotates the collet chuck mechanism 40, and this collet chuck mechanism 40 rotates the draw bar 50. That is, the hollow main shaft 30 rotates together with the draw bar 50.

The hollow main shaft 30 is not mechanically coupled to the draw bar 50 via a coupling mechanism like a key.

In FIG. 1, because the tool holder 10 is not attached to the circular conical hole 31, even if the hollow main shaft 30 is rotated, the draw bar 50 does not rotate together. In FIG. 1, basically, the hollow main shaft 30 is not rotated. When it is necessary to rotate such a shaft as a test, a dummy holder corresponding to the tool holder 10 is attached. This allows the hollow main shaft 30 and the draw bar 50 to rotate together.

Next, a mechanism and a procedure to detect that the male tapered portion 12 is properly attached to the circular conical hole 31 will be described.

Figure 3A:
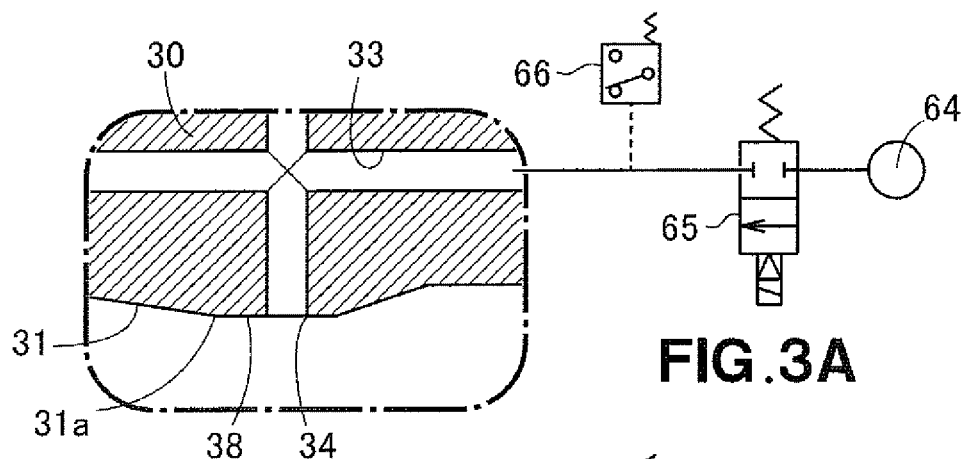
FIG. 3A is an enlarged view of a part 3A in FIG. 1.

FIG. 3A is an enlarged view of a part 3A in FIG. 1.

Preferably, as illustrated in FIG. 3A, a cylindrical portion 38 is extended from a small-diameter end 31$a$ of the circular conical hole 31, and the opening 34 is provided in this cylindrical portion 38. Because the opening 34 is provided in an offset position from the circular conical hole 31, the opening 34 is prevented from being damaged by the male tapered portion 12.

The fluid (e.g., air) supplied from a fluid source 64 is blocked by an electro-magnetic valve 65, and thus the pressure at the fluid passage 33 becomes ambient pressure.

Figure 3B:
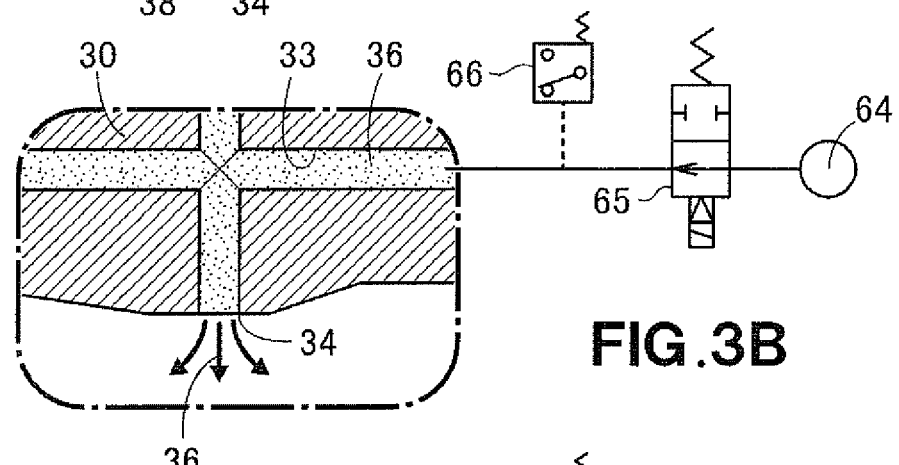
FIGS. 3B and 3C are diagrams each for describing a flow of a fluid.

Next, as illustrated in FIG. 3B, when the electro-magnetic valve 65 is opened, the fluid 36 passes through the fluid passage 33, and is blown out from the opening 34. Because it is blown out from the opening 34, the pressure at the fluid passage 33 does not increase.

Figure 3C:
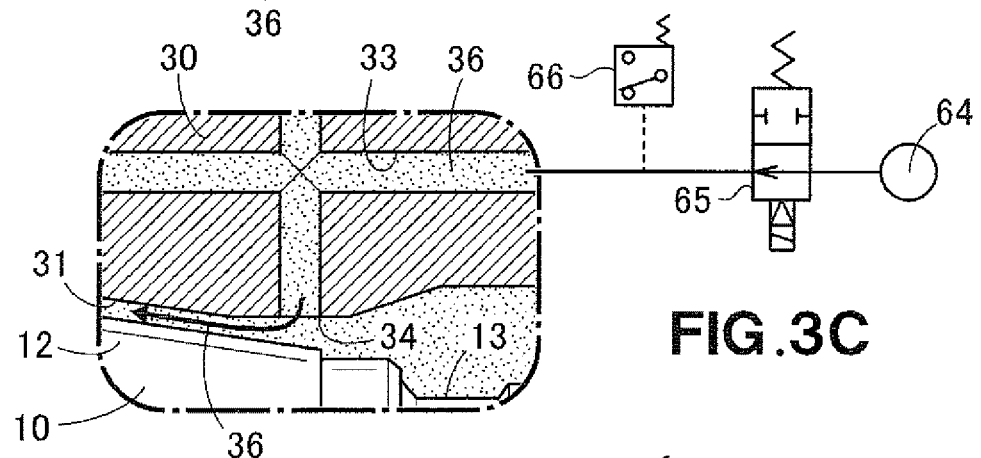

Subsequently, as illustrated in FIG. 3C, when the tool holder 10 is fitted in the circular conical hole 31, the axial line of the opening 34 intersects the male tapered portion 12 immediately before the completion of fitting.

This causes the blown fluid 36 to collide with the male tapered portion 12. Next, the fluid 36 changes the flowing direction, and flows through the clearance between the circular conical hole 31 and the male tapered portion 12 at fast speed. This fast-speed flow cleans the circular conical hole 31 and the male tapered portion 12. At this time, also, the pressure at the fluid passage 33 does not increase.

Figure 3D:
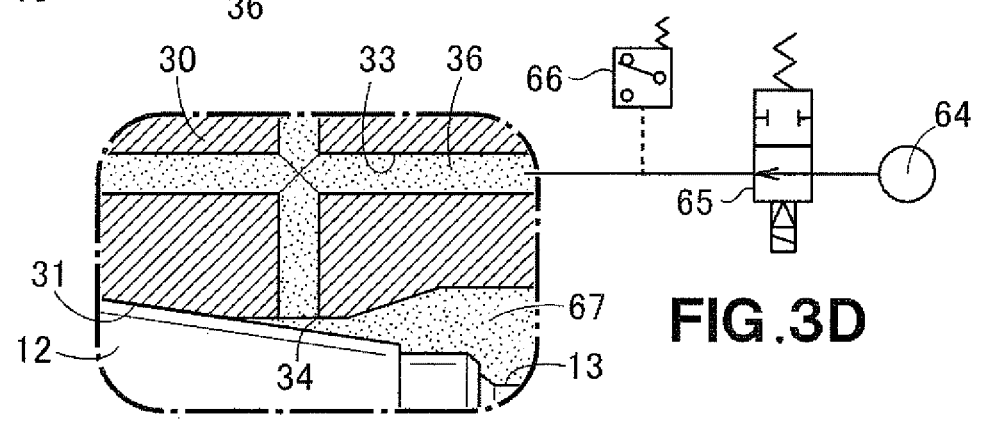
FIG. 3D is an enlarged view of a part 3D in FIG. 2.

FIG. 3D is an enlarged view of a part 3D in FIG. 2.

As illustrated in FIG. 3D, even if in a condition in which the male tapered portion 12 is fully fitted in the circular hole 31 and the clearance is extinguished and no longer exists, the opening 34 is not blocked by the male tapered portion 12. The fluid 36 remains in a closed space 67 around the pull stud 13.

Because the fluid 36 does not leak, the pressure at the closed space 67 and the fluid passage 33 increases. The increasing pressure is detected by a pressure switch 66. When the pressure switch 66 is actuated, it is detected that the male tapered portion 12 is properly seated in the circular hole 31.

The pressure switch 66 may be a pressure sensor that measures pressure. However, the pressure sensor is relatively expensive. In this point, the pressure 66 is a switch that is simply formed by two contacts, thus relatively inexpensive.

Meanwhile, when the rotating tool 11 is frequently replaced, the states in FIGS. 1 and 2 are repeated, and the plurality of disc springs 61 is repeatedly elongated and compressed. A given disc spring 61 and the adjacent disc spring 61 thereto are directly in contact with each other, and are in friction with each other, and thus slight heat is generated. Moreover, because of the direct contact, a tiny amount of contamination (particles) is produced.

By causing the fluid to flow through the clearance (see FIG. 1, 62) around the respective outer circumferences of the disc springs 61, the disc springs 61 are cooled down by this fluid. The contamination around the disc springs 61 is cleaned.

A modified example of the present disclosure will be described with reference to FIG. 4. According to this modified example, the cylindrical portion 38 that has been described with reference to FIG. 3 is not provided.

Figure 4:
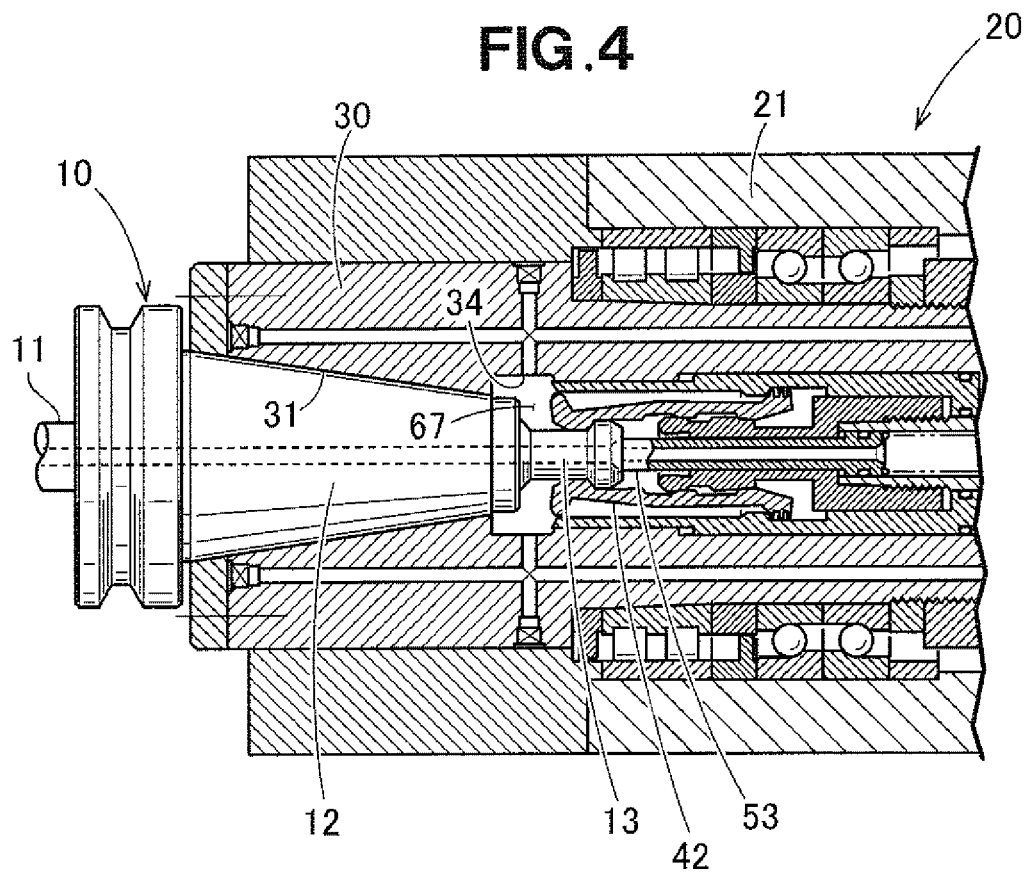
FIG. 4 is a cross-sectional view of a rotating-tool main shaft according to a modified example.
Figure 5:
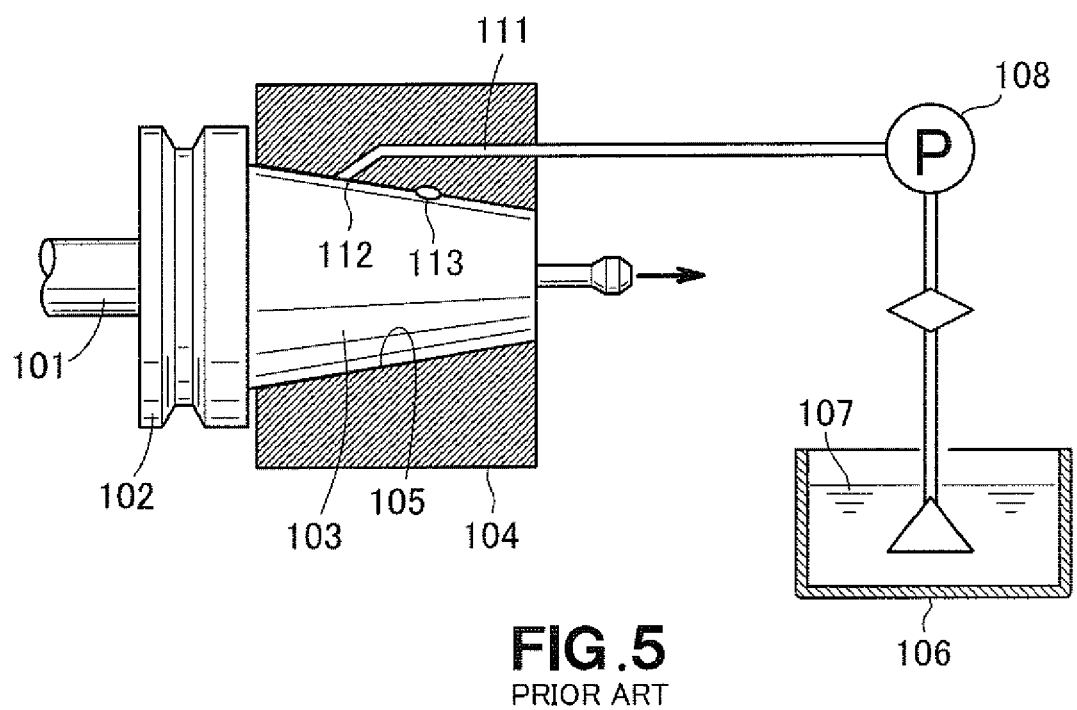
FIG. 5 is a diagram for describing a basic principle of conventional technologies.
Figure 6A:
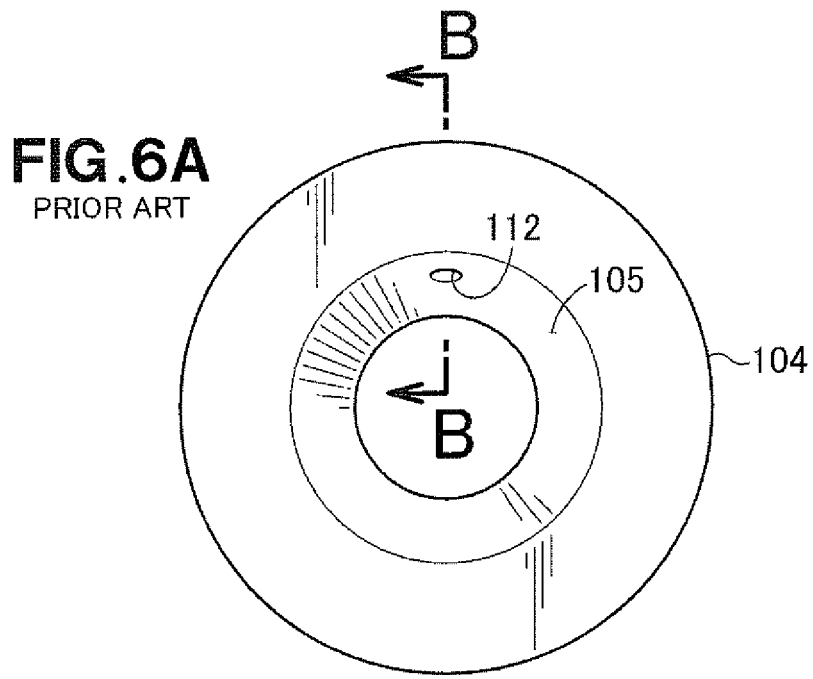
FIG. 6A is a front view of a tool holder.
Figure 6B:
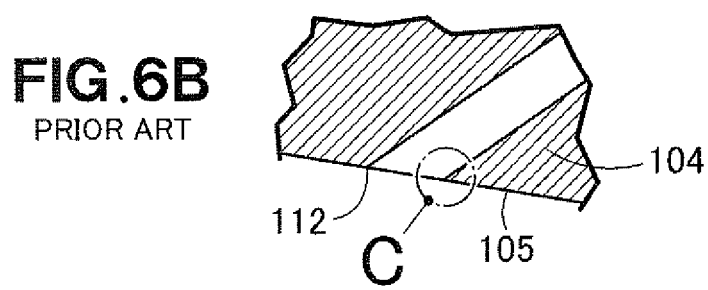
FIG. 6B is a cross-sectional view taken along a line B-B in FIG. 6A.
Figure 6C:
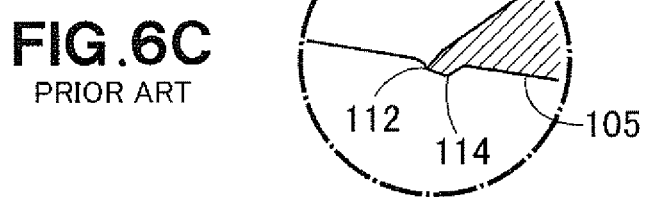
FIG. 6C is an enlarged view of a part C in FIG. 6B.
Figure 6D:
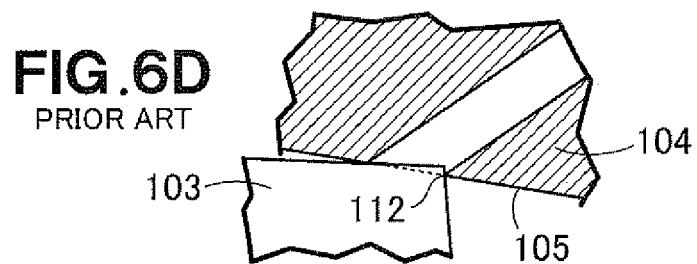
FIG. 6D is a diagram for describing a formation procedure of a dent.

As illustrated in FIG. 4, the circular conical hole 31 is elongated to a length corresponding to the male tapered portion 12. Moreover, the opening 34 is caused to be in communication with the closed space 67. Because the opening 34 is present outside the circular conical hole 31, a possibility such that a dent is formed in the edge of the opening 34 is eliminated.

However, because the axial line of the opening 34 is offset from that of the male tapered portion 12, a flow from the opening 34 does not directly collide the male tapered portion 12. However, because the fluid accumulated in the closed space 67 secondarily flows through a clearance between the circular conical hole 31 and the male tapered portion 12, a cleaning to the circular conical hole 31 and to the male tapered portion 12 is still enabled.

Hence, the opening 34 can be formed in any location as long as it is a location offset from the circular conical hole 31, but preferably, if such an opening is formed in the position illustrated in FIGS. 3A to 3D, the action and effect illustrated in FIG. 3C can be achieved.

Note that according to the embodiment, although the draw bar 50 is moved backwardly by the disc springs 61, the draw bar 50 may be moved backwardly by a coil spring, or by the hydraulic cylinder 60.

Note that according to the embodiment, although the outer diameter of the disc spring 61 is larger than the outer diameter of the collet retaining cylinder 41, it may be smaller than the outer diameter of the collet retaining cylinder 41.

Moreover, according to the embodiment, although the coolant flow channel 56 is provided in the bar main body 52, the coolant flow channel 56 may be eliminated. When such a channel is eliminated, the nozzle 53 and the spring 54 become unnecessary, and thus the draw bar 50 is formed by the bar main body 52 only.

The present disclosure is suitable for a rotating-tool main shaft with a tool seating check function which rotates a tool holder.

What is claimed is:

1. A main shaft for a rotating tool provided with a tool-seating check function, comprising:
a rotating tool held in a tool holder, the tool holder comprising a male tapered portion, and the tool holder being rotated by the main shaft;
a hollow main shaft supported by rotary bearings in a hollow ram to undergo rotation about an axis and having a conical hole formed in a front portion thereof, the conical hole having a shape that corresponds to the shape of the male tapered portion, the hollow main shaft comprising a collet chuck mechanism movable along the axis in a frontward direction to releasably engage with the tool holder, a spring retaining space provided in a rear portion of the hollow main shaft, and a disc spring retained in the spring retaining space for moving the collet chuck mechanism along the axis in a rearward direction via a draw bar to disengage the collet chuck mechanism from the tool holder; and
a fluid passage provided in the hollow main shaft and extending through the rear and front portions of the hollow main shaft, the fluid passage comprising a first section with a first central longitudinal axis extending only in a lengthwise direction parallel to the axis in the rear portion of the hollow main shaft, through a clearance between the outer circumference of the disc spring and a wall surface of the spring retaining space, a second section connected directly to the first section and with a second central longitudinal axis extending only in an outward direction orthogonal to the axis through a wall of the hollow main shaft, a third section connected directly to the second section with a third central longitudinal axis and extending only in the lengthwise direction in the front portion of the hollow main shaft through the wall of the hollow main shaft, and a fourth section connected directly to the third section and with a fourth central longitudinal axis extending only in an inward direction orthogonal to the axis through the wall of the hollow main shaft and terminating in an opening,
wherein the opening is formed in a cylindrical portion of the hollow main shaft that extends rearwardly from the rear end of the conical hole, and
wherein the opening is located frontward of both all the rotary bearings and the collet chuck mechanism and positioned to direct fluid flowing in the fluid passage onto the male tapered portion while the tool holder is being inserted into the conical hole, whereby a pressure increase of the fluid in the fluid passage indicates that the male tapered portion of the tool holder is properly seated in the conical hole.

2. The main shaft according to claim 1; wherein the fluid passage is located entirely in the hollow main shaft.

3. The main shaft according to claim 1; wherein the fluid passage branches into two identical branch passages frontward of the clearance, the two branch passages extending entirely in the wall of the hollow main shaft and a first of the two branch passages is defined by the second, third and fourth sections of the fluid passage.

4. The main shaft according to claim 3; wherein the two branch passages are symmetrical with respect to the axis.

5. The main shaft according to claim 1; wherein the collet chuck mechanism extends along the axis a first distance which is less than a second distance along the axis between the second section and the fourth section of the fluid passage.

6. A main shaft for a rotating tool provided with a tool-seating check function, comprising:
a tool holder for holding a rotating tool, the tool holder having a rearwardly extending male tapered portion, and the tool holder being rotated by the main shaft;
a hollow main shaft rotatably supported by rotary bearings in a hollow ram to undergo rotation about an axis and having a tapered surface defining a tapered hole in a front portion thereof, the tapered hole having a shape that corresponds to the shape of the male tapered portion so that the male tapered portion is capable of being inserted into the tapered hole and seated on the tapered surface, the hollow main shaft comprising a collet chuck mechanism movable along the axis in a frontward direction to releasably engage with the tool holder, a spring retaining space provided in a rear portion of the hollow main shaft, and disc springs retained in the spring retaining space for moving the collet chuck mechanism along the axis in a rearward direction via a draw bar to disengage the collet chuck mechanism from the tool holder; and
a fluid passage provided in the hollow main shaft through which fluid flows to detect that the male tapered portion is properly seated in the conical hole, the fluid passage comprising a first section with a first central longitudinal axis extending only in a lengthwise direction parallel to the axis through a first clearance between the outer circumference of the disc springs and a wall surface of the spring retaining space, a second section connected directly to the first section and with a second central longitudinal axis extending only in an outward direction orthogonal to the axis through the wall of the hollow main shaft, a third section connected directly to the second section and with a third central longitudinal axis extending only in the lengthwise direction parallel to the axis through the wall of the hollow main shaft to rearward of the tapered surface, and a fourth section connected directly to the third section and with a fourth central longitudinal axis extending only in an inward direction orthogonal to the axis through the wall of the hollow main shaft to an opening, the opening being located rearward of the tapered surface and frontward of both all the rotary bearings and the collet chuck mechanism so that fluid exiting the opening collides with the male tapered portion and flows frontward through a second clearance between the male tapered portion and the tapered surface during insertion of the male tapered portion into the tapered hole, and when the male tapered portion is properly seated, the second clearance is extinguished causing the fluid to collect in a closed space rearward of the male tapered portion thereby increasing the fluid pressure to a level indicative of proper seating of the male tapered portion.

7. The main shaft according to claim 6; wherein the opening is provided in a cylindrical portion of the main hollow shaft located rearward of the tapered surface.

8. The main shaft according to claim 6; wherein the fluid passage is located entirely in the hollow main shaft.

9. The main shaft according to claim 6; wherein the fluid passage branches into two branch passages frontward of the first clearance, the two branch passages extending entirely in the wall of the hollow main shaft.

10. The main shaft according to claim 9; wherein the two branch passages are symmetrical with respect to the axis.

11. The main shaft according to claim 6; wherein the collet chuck mechanism extends along the axis a first distance which is less than a second distance along the axis between the second section and the fourth section of the fluid passage.

* * * * *